May 28, 1963 J. E. TRUELOVE 3,091,299
FRAME AND MOUNTING MEANS FOR AN AGRICULTURAL IMPLEMENT
Filed Oct. 27, 1961 2 Sheets-Sheet 2
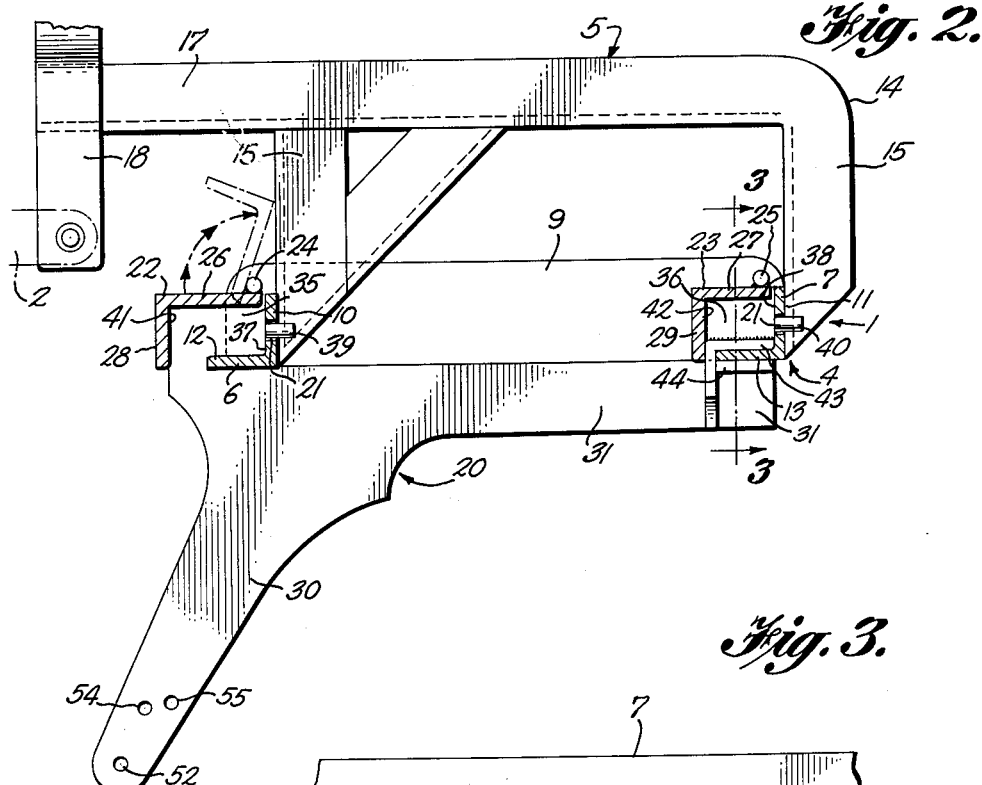
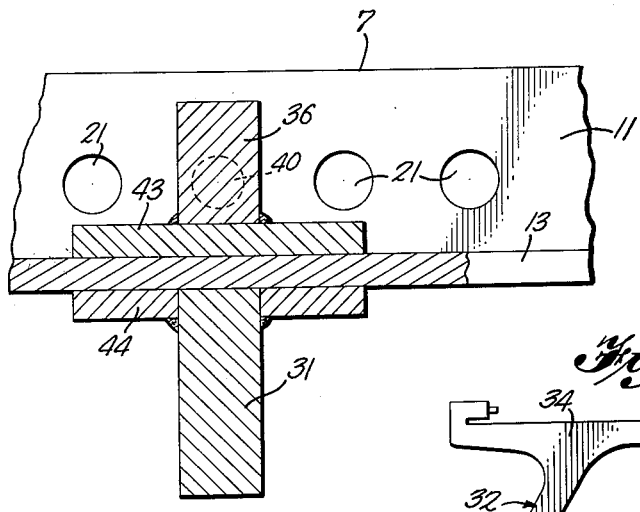
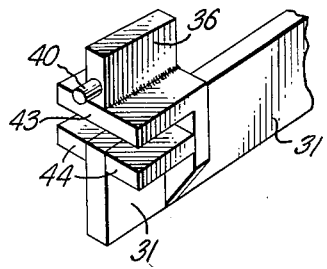
INVENTOR
James E. Truelove
BY Mason, Fenwick & Lawrence
ATTORNEYS United States Patent Office 3,091,299
Patented May 28, 1963

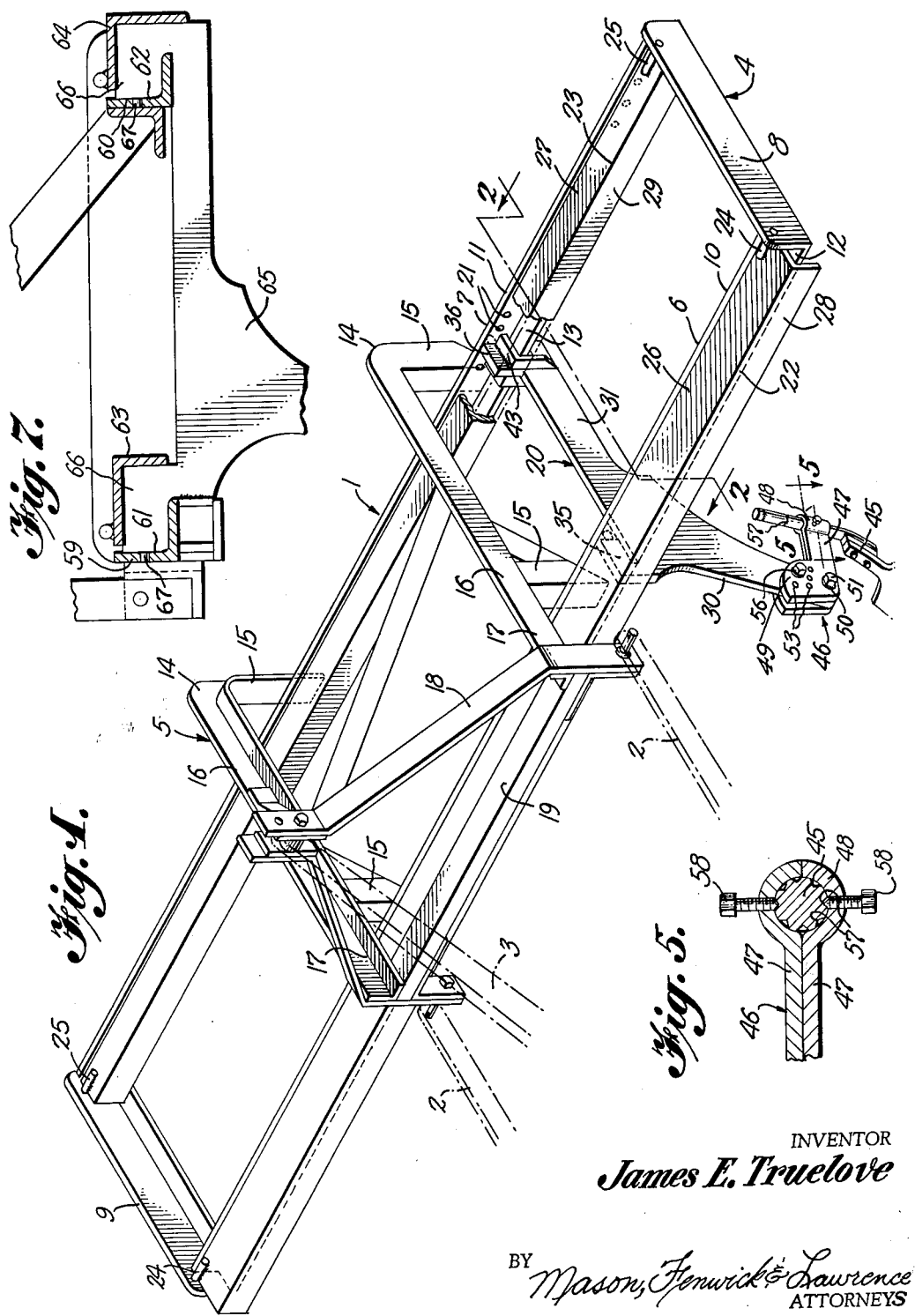

3,091,299
FRAME AND MOUNTING MEANS FOR AN AGRICULTURAL IMPLEMENT
James E. Truelove, Vernon, Ala., assignor of one-half to R. E. Bostick, Vernon, Ala.
Filed Oct. 27, 1961, Ser. No. 148,113
3 Claims. (Cl. 172—655)

This invention relates to agricultural implements, and particularly to cultivators of the type adapted for attachment to the draft and lift mechanism of a tractor. The invention is most concerned with improved means for mounting cultivator implements on a cultivator frame.

There are cultivators now in use that have generally rectangular frames in which a plurality of shanks carrying plow feet are mounted. The frame carries means for connection to conventional draft and lift means at the rear of a tractor so that the cultivator can be drawn or carried behind the tractor. The frame has pluralities of holes evenly spaced transversely of the unit to permit bolting the implement shanks at selected positions and spacings along the frame. This provides for very rigid attachment of the shanks to the frame, but when it is desired to change the location of the implements, considerable time is required to unbolt each shank, shift it to its new location and rebolt it to the frame. Frequently, this will require several hours when a large number of implements are mounted on the frame.

The principal object of the present invention is to provide a cultivator of the general type referred to which has improved means for connecting the implement shanks to the frame to permit rapid re-location of the shanks on the frame, yet hold them rigidly in position when in use.

A more specific object is the provision of a cultivator which will have means for simultaneous release, or locking, of all of the shanks, so that upon operation of the locking means all shanks will be freed for shifting, or locked against movement during use.

Another object is to provide a device of this kind wherein the shanks can be released for re-location, or locked in position, without the use of tools.

A further object of the invention is to provide a cultivator having improved means for securing plow feet to the shanks and for adjusting the plow feet relative to the shanks.

Other objects of the invention will become apparent from the following description of practical embodiments thereof, when taken in conjunction with the drawings which accompany, and form part of, this specification.

In the drawings:

FIGURE 1 is a perspective view of a cultivator embodying the principles of the present invention;

FIGURE 2 is a vertical section through the cultivator frame with a plow-supporting shank in place, and is taken on the line 2—2 of FIGURE 1;

FIGURE 3 is a detail section taken on the line 3—3 of FIGURE 2, illustrating the manner in which the shank seats upon the frame to hold the shank against tilting;

FIGURE 4 is a perspective view of one end of the shank;

FIGURE 5 is a horizontal section taken on the line 5—5 of FIGURE 1, illustrating the means for adjusting the position of the plow foot relative to its mounting cuff;

FIGURE 6 is a side elevation, on a reduced scale, of another plow-supporting shank, arranged to hold a plow at a different position relative to the cultivator frame from the one shown in the previous views; and FIGURE 7 is a view similar to FIGURE 2, of a slightly modified form of the invention.

In general, the invention contemplates a cultivator frame having series of openings to receive locating pins of plow-supporting shanks to position the shanks at desired locations and spacings on the frame, with pivoted lock rails which will release, or lock, all of the shanks simultaneously. The invention is also concerned with an improved means for mounting and adjusting the plow feet relative to the shanks.

Referring to the drawings in detail, and first adverting to that form of the invention shown in FIGURES 1 through 5, there is shown a cultivator 1 which is adapted for connection to the lift and tilting arms 2 and 3 at the rear of a tratcor. As the tractor and the lift mechanism form no part of the present invention, the tractor is not shown and the arms of the lift mechanism are shown in dotted lines.

The cultivator includes a main rectangular frame 4 and a mounting frame structure 5 carried by the main frame. The main frame is composed of front and back rails 6 and 7, of angle iron, and angle iron end members 8 and 9. The vertical flanges 10 and 11 of the front and back rails, respectively, are at the rear of the rails so that the horizontal flanges 12 and 13 project forwardly in an unobstructed manner. The rails and end members are welded, or otherwise rigidly secured together to form the rectangular frame.

The mounting frame includes a pair of arbors 14, having their legs 15 welded to the vertical flanges of the rails 6 and 7. The bridges 16 of the arbors have forward extensions 17 which support a mounting bail 18. The forward ends of the extensions 17 are held in spaced relation by means of a brace bar 19. The mounting bracket shown is merely one practical means for attaching the cultivator to a tractor. Any other mounting means may be used, as the mounting bracket structure forms no part of the present invention.

The front and back rails 6 and 7 are adapted to support a plurality of plow shanks 20 in spaced relation at selected positions along the rail lengths. To provide positioning means for the shanks, each rail has a horizontal row of spaced openings 21 in its vertical flange, extending the full length of the rail. Each rail is also provided with a companion lock rail, indicated at 22 and 23, which is positioned reversely to the frame rail with which it cooperates and is pivotally connected at its ends by pivot pins 24 and 25 to the frame end members. The lock rails have their horizontal flanges 26 and 27 spaced vertically upward from the rail horizontal flanges 12 and 13 and projecting forwardly from the pivot pins 24 and 25. The vertical flanges 28 and 29 of the lock rails depend from the forward edges of the horizontal flanges.

The plow shanks each comprise a plow-supporting leg 30 and a head beam 31. The shank shown in FIGURES 1 and 2 has the plow-supporting leg at the forward end of the head beam and is known as a forward shank. An intermediate shank 32 is shown in FIGURE 6, wherein the plow-supporting leg 33 is intermediate the length of head beam 34. Of course, shanks will be supplied having legs at all of the usual positions along the head beam, so that the plow feet can be positioned as desired relative to the main frame, as will be described.

Each shank has front and rear mounting arms 35 and 36 overlying the front and rear ends of the head beam. The arms are horizontal, with each arm being joined at its forward end to the head beam and projecting rearwardly parallel to the top edge of the head beam and spaced from the top edge of the head beam. The arms are adapted to seat upon the horizontal flanges 12 and 13 of the main frame front and back rails 6 and 7 and suspend the shank from those rails. The spacing of the arms from the top of the head beam is just enough to allow the arms to be slid onto the rail horizontal flanges with those flanges slipping freely but snugly into the spaces between the arms and beam. The rearward ends 37 and 38 of the arms form stops to abut the vertical flanges 10 and 11 of the rails to determine the fore and aft position of the shanks. Locating pins 39 and 40 project from the arms 35 and 36 for insertion into selected openings 21 in the main frame rails to hold the shanks in position lengthwise of the frame. Lock rails 22 and 23 will have their horizontal flanges seated on top of the shank arm and their vertical flanges overhanging the front shoulders 41 and 42 of the respective arms. With the lock bars down (as shown in FIGURE 2) the shanks will be held against retractive movement and removal from the frame.

It is also necessary that the shanks be held against sidewise tilting so that they will maintain a vertical position. To this end, one of the arms (the rear arm 36 as shown) is provided with upper and lower stabilizing flanges 43 and 44 to rest against the top and bottom surfaces of the horizontal flange of the rear frame rail 7. The flanges have appreciable widthwise extent for adequate bearing on the rail flange.

Plow feet 45 are attached to shank legs 30 by means of cuffs 46. The cuffs may take the form of a pair of brackets 47, each having a semi-cylindrical socket portion 48 and a mounting plate 49. The mounting plate has a pivot hole 50 to receive a pivot bolt 51 to swivelly connect the plate to the shank leg. The bolt extends through an opening 52 in the shank leg. The plate contains two radially spaced rows of openings 53, and the shank leg has companion openings 54 and 55. By having the opening 54 out of radial alignment with the opening 52 and 55 it is possible to obtain many angular settings for the cuff by inserting a bolt 56 in one of the openings 53 in the mounting plate and through the companion opening 54 or 55 in the shank leg.

When the cuff sections are bolted to the shank leg, the cylindrical portions coact to form a socket for the plow foot 45. The plow foot may have one or more annular rows of recesses 57 and set screws 58 in the socket portions of the cuff will seat in the recesses to hold the plow foot both in vertical adjustment and properly oriented relative to the shank.

With the structure shown, connected to a tractor as indicated, the thrust of the shanks when the cultivator is drawn forward is in a rearward direction and, therefore, against the front and rear rails of the frame. There will be no strain upon the lock rails and these will serve to hold the shanks in position. If it is desired to change the location of the plows, or to substitute different shanks, it is merely necessary to rock the lock rails upwardly about their pivot pins to free the mounting arms of the shanks. The shanks can then be moved forwardly to remove the locating pins 39 and 40 from the rail openings, and the shank can then be moved lengthwise of the frame to a desired position. The shank will then be moved rearwardly to insert the locating pins in the newly selected holes and the lock rails lowered to firmly lock the shanks in place. All shanks on the cultivator can be shifted in a few minutes without the need of tools.

FIGURE 7 shows a modified structure which is the reverse of that previously described. In this form, the front and back rails 59 and 60 are reversely positioned so that their vertical flanges 61 and 62 are at the front. Lock rails 63 and 64 will be at the rear of the main rails. The shanks 65 have their mounting arms 66 projecting forwardly with locating pins 67 at their front ends. It will be evident that with this form of the invention the operation will be precisely as before, but the thrust of the shanks will be against the lock rails rather than the rails of the main frame. Although this form has been found practical for most purposes, the previously described arrangement will provide greater strength and a more reliable implement.

While in the above practical embodiments of the invention have been disclosed, it will be understood that the details of construction shown and described are merely by way of example and the invention may take other forms within the scope of the appended claims.

What is claimed is:

1. An agricultural implement comprising, a rectangular frame having front and back rails, each rail having a horizontal flange and a vertical flange at the forward edge of the horizontal flange, the vertical flanges having rows of openings therein extending longitudinally of the rails, plow-foot supporting shanks each including a supporting leg and a head beam, mounting arms carried by the head beam at spaced horizontal positions equal to the spacing between the front and back rails, the arms having seating surfaces to rest upon the horizontal flanges of the rails to hang the shanks from the frame, locating pins projecting from the arms for insertion into selected openings in the rows in the rails to hold the shanks against movement lengthwise of the rails, locking rails pivotally mounted on the frame to overlie the shank mounting arms when resting on the frame rails to lock the arms against removal from the frame.

2. An agricultural implement as claimed in claim 1, wherein the frame rails have their vertical flanges at the rear edges of the horizontal flanges and the shank arms have rear edges in abutment with the rail vertical flanges when the arms are resting in the rails, and the arms have shoulders spaced from the rear edges and parallel thereto, the locking rails having locking flanges to lie in front of the shoulders of the arms to prevent movement of the arms to withdraw the locking pins.

3. An agricultural implement as claimed in claim 2, wherein the shank has means extending laterally to at least one side of the arms to bear against the frame rails to prevent sidewise tilting of the shanks relative to the frame rails.

References Cited in the file of this patent

UNITED STATES PATENTS

| | | |
|---|---|---|
| 1,427,075 | Dawson | Aug. 22, 1922 |
| 2,781,712 | Thomas et al. | Feb. 19, 1957 |
| 3,010,744 | Hollis | Nov. 28, 1961 |